(12) United States Patent
Zhong (10) Patent No.: US 11,585,674 B2
(45) Date of Patent: Feb. 21, 2023

(54) MAP MANAGEMENT SYSTEM, MAP MANAGEMENT DEVICE, AND COMPUTER-READABLE RECORDING MEDIUM

(71) Applicant: TOYOTA JIDOSHA KABUSHIKI KAISHA, Toyota (JP)

(72) Inventor: Lei Zhong, Chuo-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 87 days.

(21) Appl. No.: 17/342,697

(22) Filed: Jun. 9, 2021

(65) Prior Publication Data

US 2022/0038527 A1 Feb. 3, 2022

(30) Foreign Application Priority Data

Jul. 28, 2020 (JP) .............................. JP2020-127644

(51) Int. Cl.
G01C 21/00 (2006.01)

(52) U.S. Cl.
CPC .............................. *G01C 21/3815* (2020.08)

(58) Field of Classification Search
CPC .................................................. G01C 21/3815
See application file for complete search history.

(56) References Cited

U.S. PATENT DOCUMENTS

| | | | |
|---|---|---|---|
| 2019/0205547 A1* | 7/2019 | Horvath | G06Q 20/3674 |
| 2019/0356733 A1* | 11/2019 | Snow | G06F 16/27 |
| 2020/0042012 A1 | 2/2020 | Zander | |
| 2020/0092084 A1* | 3/2020 | Maroney | H04L 67/1008 |
| 2020/0103233 A1 | 4/2020 | McErlean | |

* cited by examiner

*Primary Examiner* — Vivek D Koppikar
*Assistant Examiner* — Godfrey Aleksander Maciorowski
(74) *Attorney, Agent, or Firm* — Oblon, McClelland, Maier & Neustadt, L.L.P.

(57) ABSTRACT

A map management system includes: at least one cloud server including a first processor configured to manage map data for a preset area; a plurality of edge servers, each edge server including a second processor configured to manage map data for a preset area; at least one vehicle including a third processor configured to collect raw data for updating map data during traveling; and a plurality of blockchains including the at least one cloud server and the plurality of edge servers.

16 Claims, 6 Drawing Sheets

MAP MANAGEMENT SYSTEM, MAP MANAGEMENT DEVICE, AND COMPUTER-READABLE RECORDING MEDIUM

CROSS-REFERENCE TO RELATED APPLICATION(S)

The present application claims priority to and incorporates by reference the entire contents of Japanese Patent Application No. 2020-127644 filed in Japan on Jul. 28, 2020.

BACKGROUND

1. Technical Field

The present disclosure relates to a map management system, a map management device, and a computer-readable recording medium.

2. Related Art

US 2020/0042012 A discloses a technique for managing an update of map data by utilizing a blockchain (distributed ledger technique).

In the technique disclosed in US 2020/0042012 A, since an update of map data for all areas is managed by one blockchain, the update speed of the data is slow and the availability of the data is low. Since this technique mainly focuses on data integrity and data consistency, for example, there is a problem that a providing source of the map data is unclear, and a traceability of the data is low. Therefore, there has been a need for a technique that can improve the integrity, consistency, traceability, and availability of the map data.

SUMMARY

In some embodiments, a map management system includes: at least one cloud server including a first processor configured to manage map data for a preset area; a plurality of edge servers, each edge server including a second processor configured to manage map data for a preset area; at least one vehicle including a third processor configured to collect raw data for updating map data during traveling; and a plurality of blockchains including the at least one cloud server and the plurality of edge servers, each blockchain being configured to, for each area, share map update data between the at least one cloud server and at least one of the plurality of edge servers, and store an update history of map data in the at least one cloud server and the at least one of the plurality of edge servers, the map update data being generated based on the raw data, the update history of the map data being an update history of map data that is updated by using the map update data.

In some embodiments, a map management device includes a processor configured to manage map data for a preset area. The processor is configured to form a plurality of blockchains. Each blockchain is configured to, for each area, share map update data between a cloud server managing the map data for the area and an edge server managing the map data of the area, and store an update history of map data in the cloud server and the edge server, the map update data being generated based on raw data acquired from a vehicle which is traveling, the update history of the map data being an update history of map data that is updated by using the map update data.

In some embodiments, provided is a non-transitory computer-readable recording medium with an executable program stored thereon. The program causes a processor configured to manage map data for a preset area to: form a plurality of blockchains. Each blockchain is configured to, for each area, share map update data between a cloud server managing the map data for the area and an edge server managing the map data of the area, and store an update history of map data, the map update data being generated based on raw data acquired from a vehicle which is traveling, the update history of the map data being an update history of map data that is updated by using the map update data.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

A map management system, a map management device, and a map management program according to an embodiment of the present disclosure will be described with reference to the drawings. Configuring elements in the following embodiments include those that can be easily replaced by those skilled in the art, or those that are substantially the same.

The map management system, the map management device, and the map management program according to the embodiment are for managing an update of a high definition map (HD map) by using a plurality of blockchains. In a service that uses the HD map data (hereinafter, referred to as "map data"), for example, raw data (image data, sensor data, and the like) related to a road on which a vehicle is traveling is collected, and a change in the road is automatically detected based on the data. Then, the map data to which the change in the road is applied is distributed to the vehicle traveling on the road.

Map Management System

Figure 1:
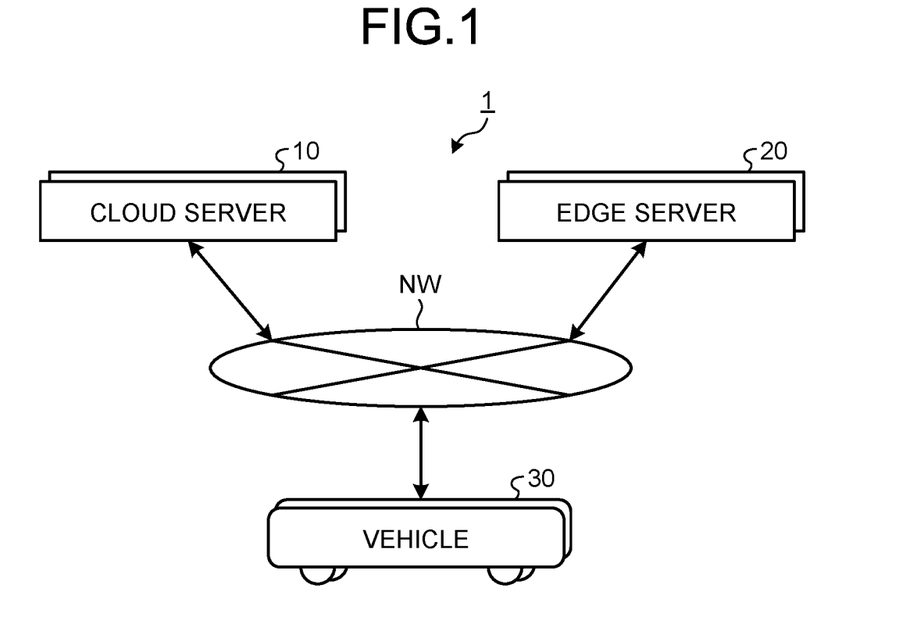
FIG. 1 is a diagram schematically illustrating a configuration of a map management system according to an embodiment.

The map management system according to the present embodiment will be described with reference to FIGS. 1 to 3. As illustrated in FIG. 1, a map management system 1 includes a cloud server 10, an edge server 20, and a vehicle 30. Specifically, the map management device according to the embodiment is realized by a function of the edge server 20. The cloud server 10, the edge server 20, and the vehicle 30 have a communication function, and are configured to be able to communicate with each other through a network NW. The network NW is configured of, for example, an Internet network, a mobile phone network, and the like.

Figure 2:
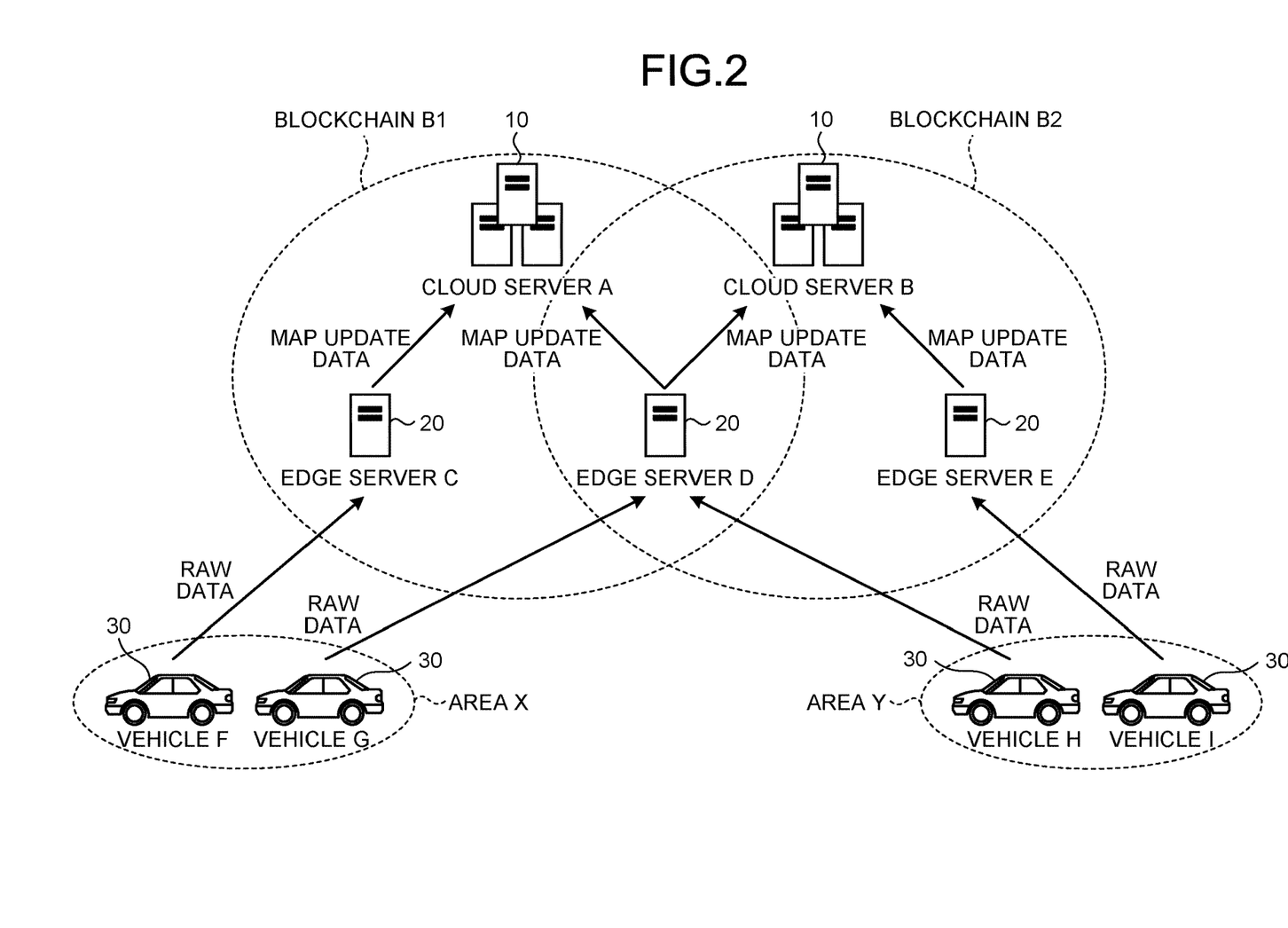
FIG. 2 is a diagram schematically illustrating a flow of processing in the map management system according to the embodiment.
Figure 3:
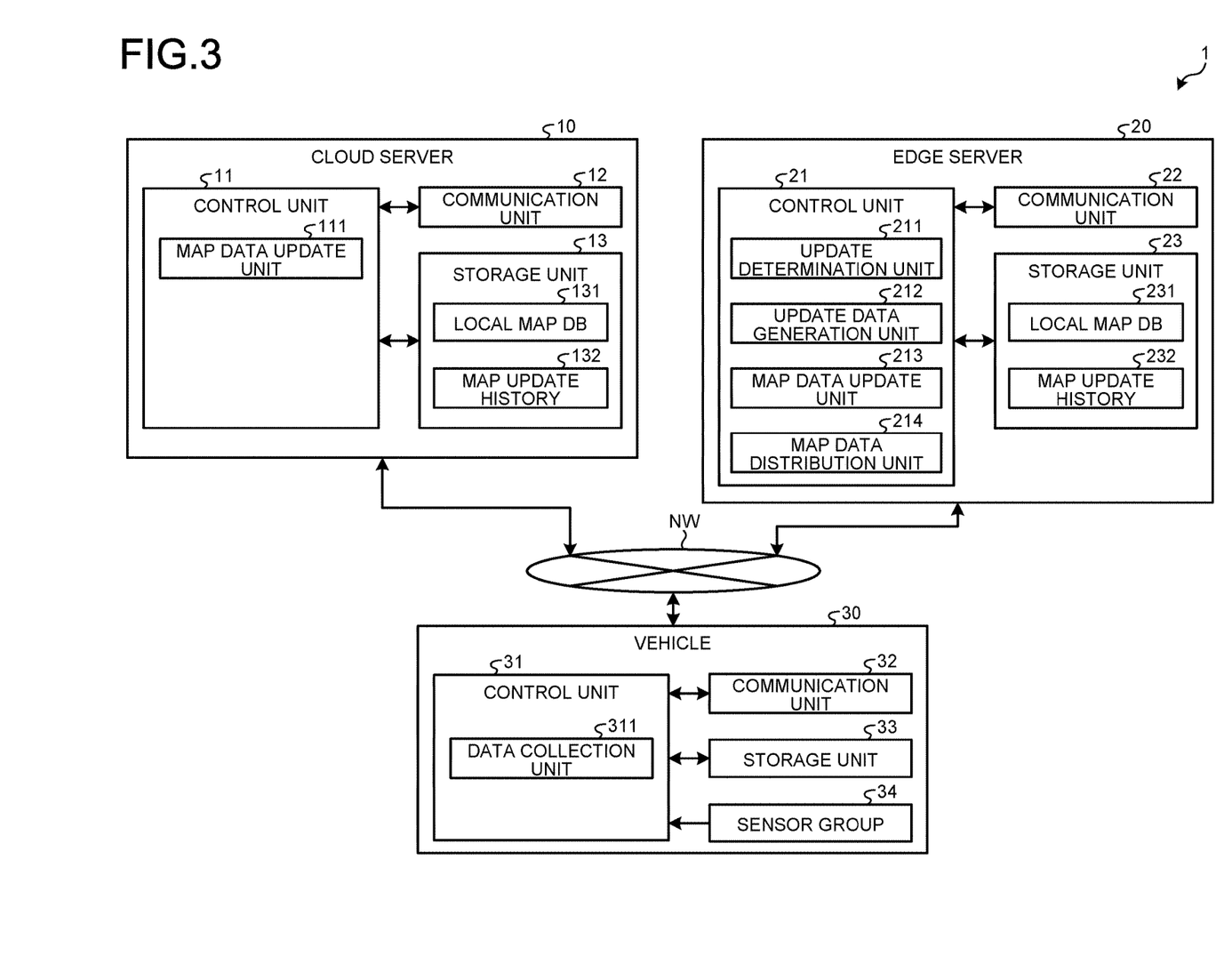
FIG. 3 is a block diagram illustrating details of each configuring element of the map management system according to the embodiment.

In the map management system 1, for example, as illustrated in FIG. 2, data is exchanged between a plurality of cloud servers 10 (cloud servers A and B), a plurality of edge servers 20 (edge servers C, D, and E), and a plurality of vehicles 30 (vehicles F, G, H, and I). In FIG. 2, the cloud server A, the edge server C, and the edge server D manage an update of the map data for an area X. The cloud server B, the edge server D, and the edge server E manage an update of the map data for an area Y. Then, for each area X, and Y, the update of the map data is managed by using edge computing and blockchain.

In this case, for example, the vehicle F traveling in the area X transmits (outputs) raw data collected from the road to the edge server C associated with the area X. Subsequently, the edge server C generates map update data based on the raw data, and transmits the map update data to the edge server D and the cloud server A, which are associated with the area X. Similarly, the vehicle G traveling in the area X transmits the raw data collected from the road to the edge server D, and the edge server D transmits the generated map update data to the edge server C and the cloud server A.

For example, the vehicle H traveling in the area Y transmits the raw data collected from the road to the edge server D associated with the area Y. Subsequently, the edge server D generates map update data based on the raw data, and transmits the map update data to the edge server E and the cloud server B, which are associated with the area Y. Similarly, the vehicle I traveling in the area Y transmits the raw data collected from the road to the edge server E, and the edge server E transmits the generated map update data to the edge server D and the cloud server B.

In this way, the map management system 1 includes a plurality of blockchains B1 and B2. In each of the blockchains B1 and B2, the map update data is shared between the cloud server 10 and the edge server 20 for each area, and an update history of the map data (local map DB), which is obtained by using the map update data is stored in the cloud server 10 and the edge server 20 for each area. That is, in the map management system 1, the update of the map data for all areas is not managed by one blockchain as in the related art, but a plurality of blockchains are included, and each blockchain manages the update of the map data for some area of all areas.

In the example of FIG. 2, one blockchain is configured by one cloud server 10, but a plurality of blockchains may be configured by one cloud server 10. In the example of FIG. 2, one cloud server 10 is associated with one area, but one cloud server 10 may be associated with a plurality of areas.

In the example of FIG. 2, the number of the cloud servers 10 and the edge servers 20, which are included in the blockchains B1 and B2, is fixed. For example, the number of the cloud servers 10 and the edge servers 20, which are included in the blockchains B1 and B2, may be changed dynamically according to an update frequency of the map data. In this case, for example, when the update frequency of the map data in the cloud server 10 and edge server 20, which are included in the blockchains B1 and B2 exceeds a preset threshold value, the number of the cloud servers 10 and the edge servers 20, which are included in the blockchains B1 and B2, may be reduced. On the other hand, when the update frequency of the map data in the cloud server 10 and the edge server 20, which are included in the blockchains B1 and B2, is the threshold value or less, the number of the cloud servers 10 and the edge servers 20, which are included in the blockchains B1 and B2, may be increased. In this way, communication cost among the cloud server 10, the edge server 20, and the vehicle 30 can be optimized by dynamically changing the number of the cloud servers 10 and the edge servers 20, which are included in the blockchains B1 and B2, according to the update frequency of the map data.

Cloud Server

The cloud server 10 manages the map data for the preset area. The cloud server 10 is realized by a general-purpose computer such as a workstation or a personal computer. The cloud server 10 includes a control unit (first processor) 11, a communication unit 12, and a storage unit 13.

Specifically, the control unit 11 includes a processor including a central processing unit (CPU), a digital signal processor (DSP), a field-programmable gate array (FPGA), and the like and a memory (main storage unit) including a random access memory (RAM), a read only memory (ROM), and the like. The control unit 11 loads a program stored in the storage unit 13 into a work area of the main storage unit to execute the program, and implements a function matching a predetermined purpose by controlling each element through the execution of the program. The control unit 11 functions as a map data update unit 111 through the execution of the program stored in the storage unit 13.

The map data update unit 111 updates a local map DB 131 based on the map update data acquired from the edge server 20 included in the same blockchain. The map data update unit 111 stores the update history at that time as a map update history 132 in the storage unit 13. In this way, the map update data and the update history of the map data are shared between the cloud server 10 and a plurality of the edge servers 20 by using the blockchain. Therefore, the integrity, consistency, traceability, and availability of the map data can be improved.

The communication unit 12 is configured of, for example, a local area network (LAN) interface board, a wireless communication circuit for wireless communication, and the like. The communication unit 12 is connected to the network NW such as Internet, which is a public communication network. The communication unit 12 performs communication between the edge server 20 and the vehicle 30 by being connected to the network NW.

The storage unit 13 is configured of a recording medium such as an erasable programmable ROM (EPROM), a hard disk drive (HDD), and a removable medium. An example of the removable medium includes disk recording medium such as a universal serial bus (USB) memory, a compact disc (CD), a digital versatile disc (DVD), and a Blu-ray (registered trademark) disc (BD). The storage unit 13 can store an operating system (OS), various programs, various tables, various databases, and the like.

The local map DB 131 and the map update history 132 are stored in the storage unit 13. The local map DB 131 is configured by, for example, a relational database in which map data for an area associated with the cloud server 10 is stored so as to be searchable. The map update history 132 is information regarding a history of an update of the local map DB 131 which is obtained by using the map update data acquired from the edge server 20 included in the same blockchain.

Edge Server

The edge server 20 manages the map data for the preset area. The edge server 20 is realized by a general-purpose computer such as a workstation or a personal computer. In the map management system 1, for example, a plurality of bases (map data distribution bases) are provided in geographically separated locations, and the edge server 20 is provided in each base.

The edge server 20 includes a control unit (second processor) 21, a communication unit 22, and a storage unit 23. The configurations of the communication unit 22 and the storage unit 23 are the same as those of the communication unit 12 and the storage unit 13 of the cloud server 10. The control unit 21 functions as an update determination unit 211, an update data generation unit 212, a map data update unit 213, and a map data distribution unit 214 through the execution of the program stored in the storage unit 23.

The update determination unit 211 determines whether or not the map data needs to be updated. When a change in the road in an area is detected based on the raw data acquired from the vehicle 30, the update determination unit 211 determines that the map data for the area needs to be updated. For example, when the map data for a certain area is not updated for a certain period of time, the update determination unit 211 determines that the map data for the area needs to be updated. For example, when information that a trouble or an accident occurs in a certain area is acquired from the vehicle 30, the update determination unit 211 determines that the map data for the area needs to be updated.

Here, when the map data for a certain area is not updated for a certain period of time, or information that a trouble or an accident occurs in a certain area is acquired from the vehicle 30, the update determination unit 211 may request transmission of the raw data to the vehicle 30 which is traveling in this area. In this way, the map update data may be generated only when necessary by acquiring the raw data from the vehicle 30 in accordance with a request from the edge server 20 as a trigger. Therefore, a processing load of the edge server 20 can be reduced.

The update data generation unit 212 generates map update data based on the raw data acquired from the vehicle 30. Then, the update data generation unit 212 transmits the generated map update data to the edge server 20 and the cloud server 10, which are included in the same blockchain. The map update data may include information regarding the vehicle 30 that provides the raw data and the edge server 20 that generates the map update data. In this way, since the map update data includes information regarding the vehicle 30 that provides the raw data and the edge server 20 that generates the map update data, the traceability of the map data can be improved.

The map data update unit 213 updates a local map DB 231 based on the map update data generated by the update data generation unit 212. The map data update unit 213 updates the local map DB 231 based on the map update data acquired from the edge server 20 included in the same blockchain. The map data update unit 213 stores the update history at that time as a map update history 232 in the storage unit 23. In this way, the map update data and the update history of the map data are shared between the cloud server 10 and a plurality of the edge servers 20 by using the blockchain. Therefore, the integrity, consistency, traceability, and availability of the map data can be improved.

The map data distribution unit 214 transmits the map data of the corresponding area to the vehicle in response to a request from the vehicle 30. Accordingly, the vehicle 30 can acquire the latest map data for the area in which the vehicle is traveling.

The local map DB 231 and the map update history 232 are stored in the storage unit 23. The local map DB 231 is configured by, for example, a relational database in which map data for an area associated with the edge server 20 is stored so as to be searchable. The map update history 232 is information regarding a history of an update of the local map DB 231 which is obtained by using the map update data acquired from the edge server 20 included in the same blockchain.

Vehicle

The vehicle 30 is a mobile body that can communicate with the outside. The vehicle 30 collects the raw data for updating the map data about the road while the vehicle 30 is traveling on the road.

The vehicle 30 includes a control unit (third processor) 31, a communication unit 32, a storage unit 33, and a sensor group 34. The control unit 31 is an electronic control unit (ECU) that comprehensively controls an operation of various elements mounted on the vehicle 30. The control unit 31 functions as a data collection unit 311 through the execution of the program stored in the storage unit 33.

The data collection unit 311 collects the raw data by using the sensor group 34 while the vehicle 30 is traveling. Examples of information collected by the data collection unit 311 include road images (videos) around the vehicle 30, sensor data, CAN data, and in-vehicle images (videos). The data collection unit 311 transmits the raw data collected while the vehicle 30 is traveling to the edge server 20 that manages the map data for the corresponding area.

The vehicle 30 identifies the edge server 20 with which an own vehicle communicates, for example, based on a routing table owned or acquired in advance. The "routing table" indicates a correspondence table between an area and the edge server 20 associated with the area in order to identify the edge server 20 with which the vehicle 30 communicates. The routing table is owned by the vehicle 30 in advance, or is acquired from the edge server 20 or the cloud server 10, which is associated with a certain area, when the vehicle 30 enters the certain area.

Here, the data collection unit 311 may transmit the raw data to the edge server 20 in response to the request from the edge server 20. In this way, the raw data may be transmitted only when necessary by transmitting the raw data from the vehicle 30 in accordance with the request from the edge server 20 as a trigger. Therefore, communication cost between the vehicle 30 and the edge server 20, and a processing load of the vehicle 30 can be reduced.

The data collection unit 311 determines whether or not the map data in the edge server 20 needs to be updated based on a preset standard, and when the data collection unit 311 determines that the map data needs to be updated, the raw data may be transmitted to the edge server 20. In this way, the raw data may be transmitted only when the map data in the edge server 20 needs to be updated. Therefore, communication cost between the vehicle 30 and the edge server 20, and a processing load of the vehicle 30 can be reduced.

When it is determined that the map data needs to be updated in the vehicle 30, and the raw data is transmitted to the edge server 20 from the vehicle 30, the update determination unit 211 of the edge server 20 may determine whether or not the map data needs to be updated again. For example, a case in which a plurality of the vehicles 30 determine that the map data needs to be updated, and the raw data is transmitted to the edge server 20 from the vehicles 30 is considered for a road in a certain area. In this case, the update determination unit 211 determines that the map data needs to be updated when the number of the vehicles 30 that transmit the raw data is a predetermined number or more (for example, twenty or more). In this way, only when the edge server 20 receives the raw data from the vehicles 30 and a necessity to update the map data is high, the map data may be updated. Therefore, a processing load of the edge server 20 can be reduced.

Here, the description is made on the premise that only the raw data is collected in the vehicle 30 and the map update data is generated in the edge server 20, but the map update data may be generated in the vehicle 30. In this case, the control unit 31 generates map update data based on the raw data collected during traveling, and transmits the map update data to the edge server 20 that manages the map data for the corresponding area. Then, the control unit 21 of the edge server 20 transmits the map update data acquired from the vehicle 30 to the edge server 20 and the cloud server 10, which are included in the same blockchain.

According to this, the map data update unit 213 of the edge server 20 which acquires the map update data from the edge server 20 included in the same blockchain updates the map data based on the map update data. The map data update unit 213 stores the update history at that time as a map update history 232 in the storage unit 23.

Further, the map data update unit 111 of the cloud server 10 which acquires the map update data from the edge server 20 included in the same blockchain updates the map data based on the map update data. The map data update unit 111 stores the update history at that time as a map update history 132 in the storage unit 13. In this way, the map update data does not need to be generated in the edge server 20 since the map update data is generated in the vehicle 30. Therefore, a processing load of the edge server 20 can be reduced.

The communication unit 32 is configured of, for example, a data communication module (DCM), and the like, and communicates between the cloud server 10 and the edge server 20 by wireless communication via the network NW. For example, the raw data collected by the vehicle 30, and the map data acquired from the edge server 20 are stored in the storage unit 33 as needed.

The sensor group 34 includes, for example, a vehicle speed sensor, an acceleration sensor, a GPS sensor, a traveling space sensor (3D-LiDAR), a millimeter wave sensor, a camera (imaging device), a temperature sensor, a humidity sensor, and a pressure sensor. The sensor group 34 outputs the detected raw data to the data collection unit 311.

Map Management Method (First Example)

Figure 4:
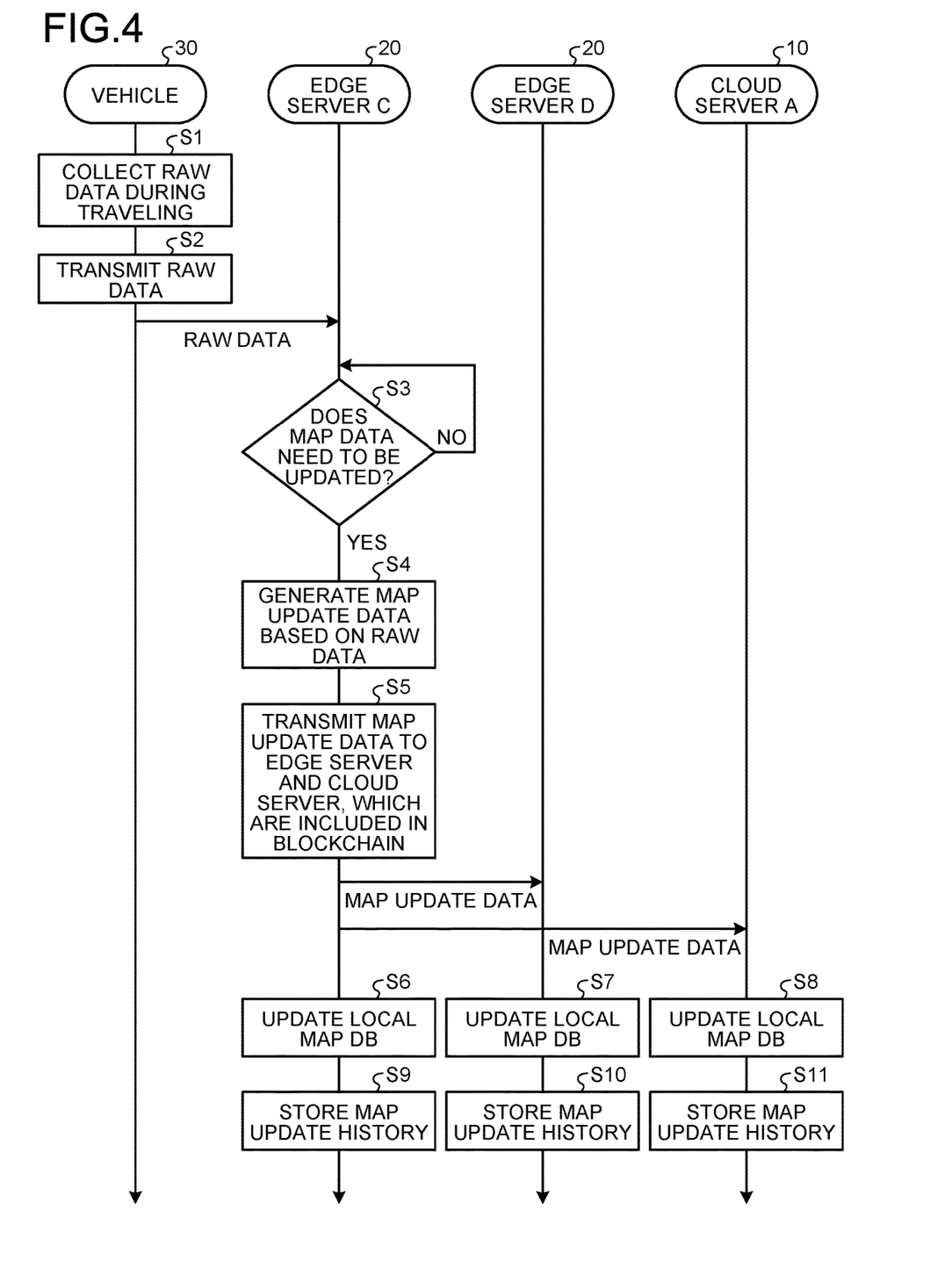
FIG. 4 is a flowchart illustrating a first example of an information providing method executed by the map management system according to the embodiment.

A first example of the processing procedure of the map management method executed by the map management system 1 according to the embodiment will be described with reference to FIG. 4. Here, processing that the raw data is actively transmitted from the vehicle 30 to the edge server 20 and the map update data is generated in the edge server 20 will be described. In the following, of the two blockchains illustrated in FIG. 2, processing in the "blockchain B1" will be assumed and described. Therefore, the cloud server 10 will be described by being replaced with a "cloud server A", one of the two edge servers 20 will be described by being replaced with an "edge server C", and the other of the two edge servers 20 will be described by being replaced with an "edge server D."

First, the data collection unit 311 of the vehicle 30 collects raw data during traveling (Step S1), and transmits the raw data to the edge server C (Step S2). Subsequently, the update determination unit 211 of the edge server C determines whether or not the map data needs to be updated (Step S3).

When it is determined that the map data does not need to be updated (No in Step S3), the update determination unit 211 returns the processing to Step S3. On the other hand, when it is determined that the map data needs to be updated (Yes in Step S3), the update data generation unit 212 generates map update data based on the raw data (Step S4). Subsequently, the update data generation unit 212 transmits the map update data to the edge server D and the cloud server A, which are included in the same blockchain B1 (Step S5).

Subsequently, the map data update unit 213 of the edge servers C and D updates the local map DB 231 (Steps S6 and S7). The map data update unit 111 of the cloud server A updates the local map DB 131 (Step S8).

Subsequently, the map data update unit 213 of the edge servers C and D stores the map update history 232 in the storage unit 23 (Steps S9 and S10). The map data update unit 111 of the cloud server A stores the map update history 132 in the storage unit 13 (Step S11). According to this, the processing is ended.

Map Management Method (Second Example)

Figure 5:
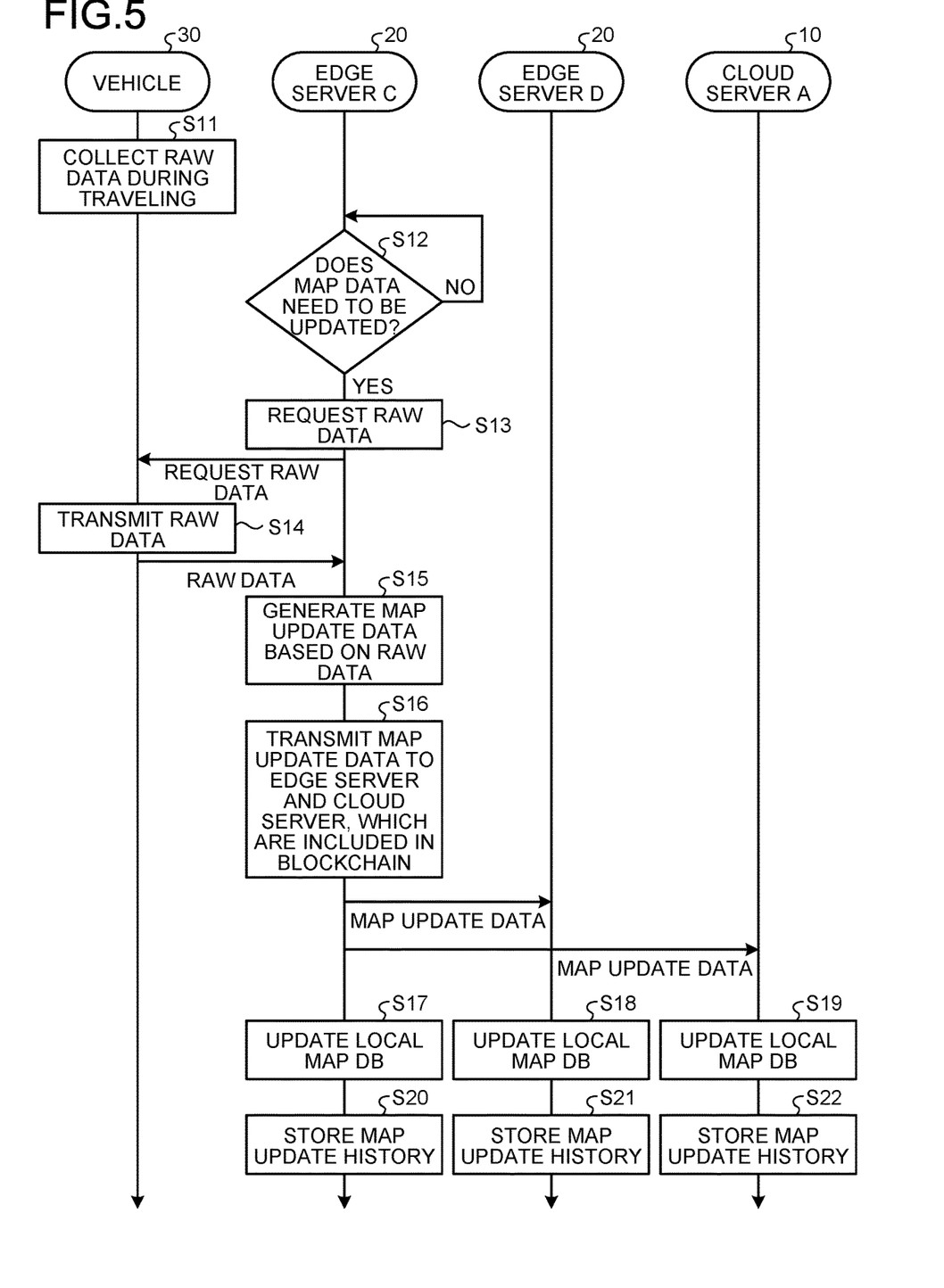
FIG. 5 is a flowchart illustrating a second example of the information providing method executed by the map management system according to the embodiment.

A second example of the processing procedure of the map management method executed by the map management system 1 according to the embodiment will be described with reference to FIG. 5. Here, processing that the raw data is transmitted from the vehicle 30 to the edge server 20 in response to the request from the edge server 20 and the map update data is generated in the edge server 20 will be described. In the following, of the two blockchains illustrated in FIG. 2, processing in the "blockchain B1" will be assumed and described. Therefore, the cloud server 10 will be described by being replaced with a "cloud server A", one of the two edge servers 20 will be described by being replaced with an "edge server C", and the other of the two edge servers 20 will be described by being replaced with an "edge server D."

First, the data collection unit 311 of the vehicle 30 collects the raw data during traveling (Step S11). Subsequently, the update determination unit 211 of the edge server C determines whether or not the map data needs to be updated (Step S12).

When it is determined that the map data does not need to be updated (No in Step S12), the update determination unit 211 returns the processing to Step S12. On the other hand, when it is determined that the map data needs to be updated (Yes in Step S12), the update determination unit 211 requests the raw data to the vehicle 30 (Step S13). According to this, the data collection unit 311 transmits the raw data to the edge server C (Step S14).

Subsequently, the update data generation unit 212 generates map update data based on the raw data (Step S15). Subsequently, the update data generation unit 212 transmits the map update data to the edge server D and the cloud server A, which are included in the same blockchain B1 (Step S16).

Subsequently, the map data update unit 213 of the edge servers C and D updates the local map DB 231 (Steps S17 and S18). The map data update unit 111 of the cloud server A updates the local map DB 131 (Step S19).

Subsequently, the map data update unit 213 of the edge servers C and D stores the map update history 232 in the storage unit 23 (Steps S20 and S21). The map data update unit 111 of the cloud server A stores the map update history 132 in the storage unit 13 (Step S22). According to this, the processing is ended.

Map Management Method (Third Example)

Figure 6:
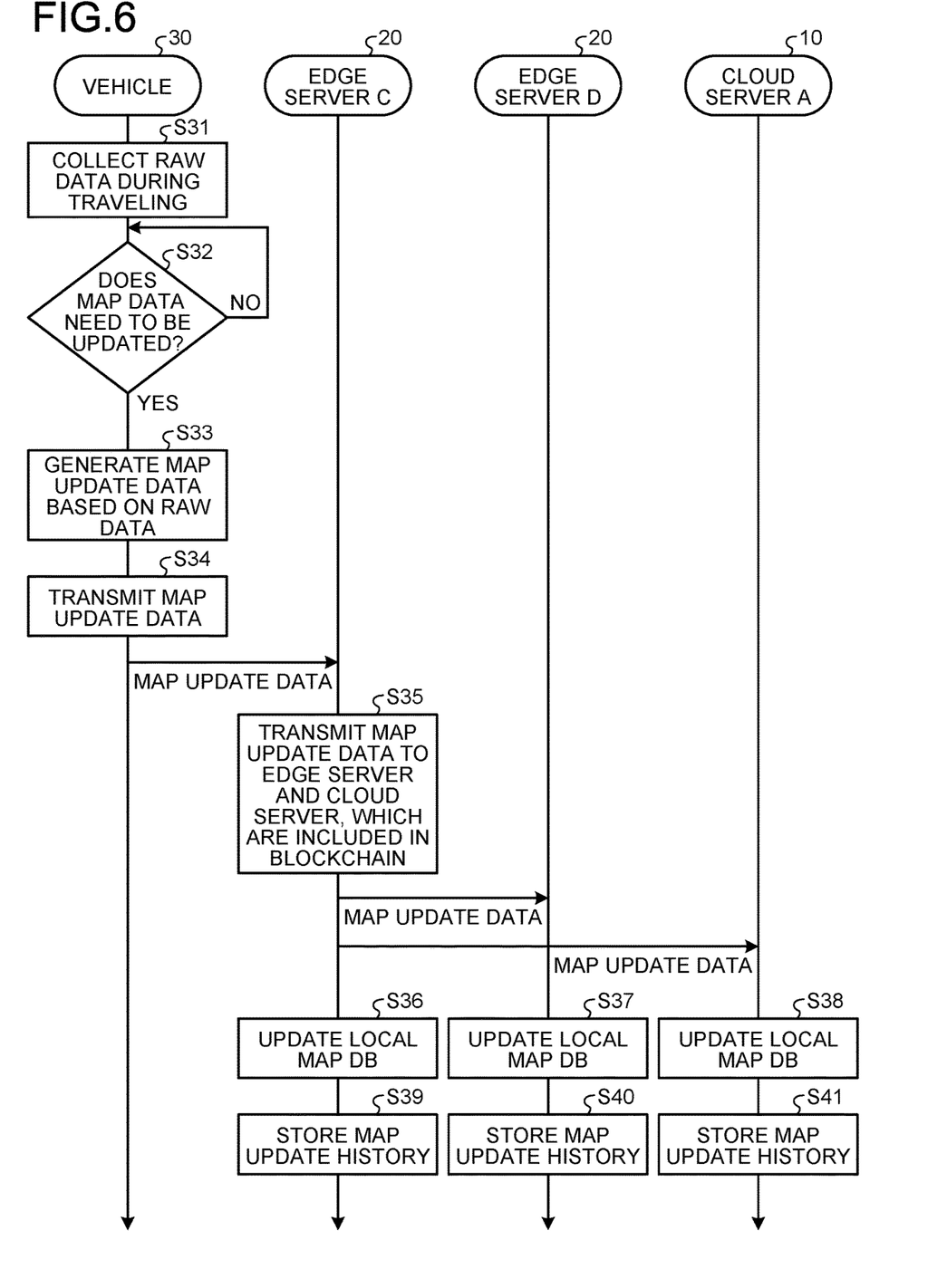
FIG. 6 is a flowchart illustrating a third example of the information providing method executed by the map management system according to the embodiment.

A third example of the processing procedure of the map management method executed by the map management system 1 according to the embodiment will be described with reference to FIG. 6. Here, processing that the map update data is generated based on the raw data in the vehicle 30 will be described. In the following, of the two blockchains illustrated in FIG. 2, processing in the "blockchain B1" will be assumed and described. Therefore, the cloud server 10 will be described by being replaced with a "cloud server A", one of the two edge servers 20 will be described by being replaced with an "edge server C", and the other of the two edge servers 20 will be described by being replaced with an "edge server D."

First, the data collection unit 311 of the vehicle 30 collects the raw data during traveling (Step S31). Subsequently, the control unit 31 determines whether or not the map data needs to be updated (Step S32).

When it is determined that the map data does not need to be updated (No in Step S32), the control unit 31 returns the processing to Step S32. On the other hand, when it is determined that the map data needs to be updated (Yes in Step S32), the control unit 31 generates map update data based on the raw data (Step S33). Subsequently, the control unit 31 transmits the map update data to the edge server C (Step S34) Subsequently, the update data generation unit 212 of the edge server C transmits the map update data to the edge server D and the cloud server A, which are included in the same blockchain B1 (Step S35).

Subsequently, the map data update unit 213 of the edge servers C and D updates the local map DB 231 (Steps S36 and S37). The map data update unit 111 of the cloud server A updates the local map DB 131 (Step S38).

Subsequently, the map data update unit 213 of the edge servers C and D stores the map update history 232 in the storage unit 23 (Steps S39 and S40). The map data update unit 111 of the cloud server A stores the map update history 132 in the storage unit 13 (Step S41). According to this, the processing is ended.

As described above, in the map management system 1, the information providing device, and the information providing program according to the embodiment, the update of the map data is managed by using the edge computing and the blockchain. Therefore, the integrity, consistency, traceability, and availability of the map data can be improved.

In the related art, since a dedicated vehicle that collects data collects data for a road instead of a general vehicle, and the map data is updated after map update data is generated offline, the map data may be updated monthly or yearly. On the other hand, in the map management system 1, the information providing device, and the information providing program according to the embodiment, since data for a road is collected by the general vehicle 30, and the map data is updated online after map update data is generated, the map data can be updated immediately when the map data needs to be updated.

According to the present disclosure, the integrity, consistency, traceability, and availability of the map data can be improved.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A map management system comprising:
at least one cloud server including a first processor configured to manage map data for a preset area;
a plurality of edge servers, each edge server including a second processor configured to manage map data for a preset area;
at least one vehicle including a third processor configured to collect raw data for updating map data during traveling; and
a plurality of blockchains including the at least one cloud server and the plurality of edge servers, each blockchain being configured to, for each area, share map update data between the at least one cloud server and at least one of the plurality of edge servers, and store an update history of map data in the at least one cloud server and the at least one of the plurality of edge servers, the map update data being generated based on the raw data, the update history of the map data being an update history of map data that is updated by using the map update data, wherein
the blockchain includes the at least one cloud server and a first edge server and a second edge server of the plurality of edge servers,
the third processor is configured to output the raw data collected, while the at least one vehicle is traveling, to the first edge server managing map data for a corresponding area,
the second processor of the first edge server is configured to
generate the map update data based on the raw data acquired from the at least one vehicle, and
output the generated map update data to the second edge server and the at least one cloud server of the blockchain,
the second processor of the second edge server is configured to
update the map data of the second edge server based on the map update data acquired from the first edge server of the blockchain, and
store the update history of the map data of the second edge server, in the second edge server,
the first processor is configured to
update the map data of the at least one cloud server based on the map update data acquired from the first edge server of the blockchain, and
store the update history of the map data of the at least one cloud server, in the at least one cloud server,
when an update frequency of the map data in the at least one cloud server of the blockchain and an update frequency of the map data in the at least one of the plurality of edge servers of the blockchain exceed preset threshold values, reduce a number of the at least one cloud servers and the at least one of the plurality of edge servers of the blockchain, and
when the update frequency of the map data in the at least one cloud server of the blockchain and an update frequency of the map data in the at least one of the plurality of edge servers of the blockchain are the threshold values or less, increase the number of the at least one cloud servers and the at least one of the plurality of edge servers of the blockchain.

2. The map management system according to claim 1, wherein
the second processor of the first edge server is further configured to request the raw data to the at least one vehicle that is traveling in the area in which the map data of the first edge server is not updated for a certain period of time, and
the third processor is further configured to output the raw data to the first edge server in response to a request from the second processor of the first edge server.

3. The map management system according to claim 1, wherein
the third processor is further configured to
determine whether or not the map data of the first edge server needs to be updated based on a preset standard, and
output the raw data to the first edge server when it is determined that the map data of the first edge server needs to be updated.

4. The map management system according to claim 1, wherein
the blockchain includes the at least one cloud server and a first edge server and a second edge server of the plurality of edge servers,
the third processor is configured to
generate the map update data based on the raw data collected during traveling, and
output the generated map update data to the first edge server managing map data for a corresponding area,
the second processor of the first edge server is configured to output the map update data output from the third processor to the second edge server and the at least one cloud server of the blockchain,
the second processor of the second edge server is configured to
update the map data based on the map update data acquired from the first edge server of the blockchain, and
store the update history of the map data of the second edge server, in the second edge server, and
the first processor is configured to
updates the map data of the at least one cloud server based on the map update data acquired from the first edge server of the blockchain, and
store the update history of the map data of the at least one cloud server, in the at least one cloud server.

5. The map management system according to claim 1, wherein
the second processor is further configured to output the map data for a corresponding area to the at least one vehicle in response to a request from the at least one vehicle.

6. The map management system according to claim 1, wherein
the map update data includes information regarding a providing source of the raw data and a generation source of the map update data.

7. A map management device comprising
a processor configured to
manage map data for a preset area, the processor being configured to form a plurality of blockchains, each blockchain being configured to, for each area, share map update data between at least one cloud server managing the map data for the area and at least one of a plurality of edge servers managing the map data of the area, and store an update history of map data in the at least one cloud server and the at least one of the plurality of edge servers, the map update data being generated based on raw data acquired from a vehicle which is traveling, the update history of the map data being an update history of map data that is updated by using the map update data,
generate the map update data based on the raw data acquired from the vehicle,
output the generated map update data to the at least one of the plurality of edge servers and the at least one cloud server, which are included in a same blockchain,
update the map data based on the map update data acquired from the at least one of the plurality of edge servers of the same blockchain,
store the update history of the updated map data,
when an update frequency of the map data in the at least one cloud server of the blockchain and an update frequency of the map data in the at least one of the plurality of edge servers of the blockchain exceed preset threshold values, reduce a number of the at least one cloud servers and the at least one of the plurality of edge servers of the blockchain, and
when the update frequency of the map data in the at least one cloud server of the blockchain and an update frequency of the map data in the at least one of the plurality of edge servers of the blockchain are the threshold values or less, increase the number of the at least one cloud servers and the at least one of the plurality of edge servers of the blockchain.

8. The map management device according to claim 7, wherein
the processor is further configured to request the raw data to the vehicle that is traveling in the area in which the map data is not updated for a certain period of time.

9. The map management device according to claim 7, wherein
the processor is further configured to
acquire the map update data from the vehicle,
output the acquired map update data to the at least one of the plurality of edge servers and the at least one cloud server, which are included in a same blockchain,
update the map data based on the map update data acquired from the at least one of the plurality of edge servers of the same blockchain, and
store the update history of the updated map data.

10. The map management device according to claim 7, wherein
the processor is further configured to output the map data for a corresponding area to the vehicle in response to a request from the vehicle.

11. The map management device according to claim 7, wherein
the map update data includes information regarding a providing source of the raw data and a generation source of the map update data.

12. A non-transitory computer-readable recording medium with an executable program stored thereon, the program causing a processor configured to manage map data for a preset area to:
form a plurality of blockchains, each blockchain being configured to, for each area, share map update data between at least one cloud server managing the map data for the area and at least one of a plurality of edge servers managing the map data of the area, and store an update history of map data, the map update data being generated based on raw data acquired from a vehicle which is traveling, the update history of the map data being an update history of map data that is updated by using the map update data;

generate the map update data based on the raw data acquired from the vehicle;

output the generated map update data to the at least one of the plurality of edge servers and the at least one cloud server, which are included in a same blockchain;

update the map data based on the map update data acquired from the at least one of the plurality of edge servers of the same blockchain;

store the update history of the updated map data;

when an update frequency of the map data in the at least one cloud server of the blockchain and an update frequency of the map data in the at least one of the plurality of edge servers of the blockchain exceed preset threshold values, reduce a number of the at least one cloud servers and the at least one of the plurality of edge servers of the blockchain; and when the update frequency of the map data in the at least one cloud server of the blockchain and an update frequency of the map data in the at least one of the plurality of edge servers of the blockchain are the threshold values or less, increase the number of the at least one cloud servers and the at least one of the plurality of edge servers of the blockchain.

13. The recording medium according to claim 12, wherein the program causes the processor to request the raw data to the vehicle that is traveling in the area in which the map data is not updated for a certain period of time.

14. The recording medium according to claim 12, wherein the program causes the processor to:

acquire the map update data from the vehicle;

output the acquired map update data to the at least one of the plurality of edge servers and the at least one cloud server, which are included in a same blockchain;

update the map data based on the map update data acquired from the at least one of the plurality of edge servers of the same blockchain; and store the update history of the updated map data.

15. The recording medium according to claim 12, wherein the program causes the processor to output the map data for a corresponding area to the vehicle in response to a request from the vehicle.

16. The recording medium according to claim 12, wherein the program causes the map update data to include information regarding a providing source of the raw data and a generation source of the map update data.

* * * * *